United States Patent

Scannell et al.

[15] 3,675,425

[45] July 11, 1972

[54] VARIABLE THRUST REACTION MOTOR WITH MULTIPLE SETS INJECTOR ORIFICES

[72] Inventors: Paul R. Scannell, Saratoga; Phil D. La Force, San Jose; Wayne T. O'Connell, Oakland, all of Calif.

[73] Assignee: United Aircraft Corporation, East Hartford, Conn.

[22] Filed: July 11, 1966

[21] Appl. No.: 564,144

[52] U.S. Cl. ........................... 60/258, 60/39.74 A, 239/404
[51] Int. Cl. ............................................................. F02k 9/02
[58] Field of Search ........................ 60/204, 39.74, 258; 239/5, 239/11, 66, 76, 396, 444, 404, 422; 137/599

[56] References Cited

UNITED STATES PATENTS

| 3,308,619 | 3/1967 | Richardson et al. | 60/258 |
| 3,137,130 | 6/1964 | Tinkelenberg | 60/258 |
| 3,117,417 | 1/1964 | Rutkowski, Jr. | 60/258 |
| 2,763,126 | 9/1956 | Halford et al. | 60/259 |
| 2,544,419 | 3/1951 | Goddard | 60/260 |
| 2,701,164 | 2/1955 | Purchas Jr. et al. | 239/404 |
| 2,703,260 | 3/1955 | Olson et al. | 239/404 |

*Primary Examiner*—Samuel Feinberg
*Attorney*—Steven F. Stone

[57] ABSTRACT

A variable thrust fluid propellant rocket motor is provided with an injector supplied with first and second fuel and oxidizer feed lines, each line being equipped with variable flow valves. The injector is adapted to cause impingements of the first fuel and oxidizer streams on the second fuel and oxidizer streams. At low thrust levels, only the first streams are used. When higher thrust levels are required, flow of the second streams is initiated and impingement of the first streams on the second streams provides for mixing of the propellants.

2 Claims, 3 Drawing Figures

INVENTORS.
PAUL R. SCANNELL
PHIL D. LA FORCE
WAYNE T. O'CONNELL

BY _____
ATTORNEY

VARIABLE THRUST REACTION MOTOR WITH MULTIPLE SETS INJECTOR ORIFICES

BACKGROUND OF THE INVENTION

This invention relates to liquid propellant reaction motors and, more particularly, to a system for producing variable thrust levels in liquid propellant reaction motors.

Many space and earth missions for liquid propellant rocket motors require engines which are capable of operating at varying thrust levels and several general approaches have been taken in the development of such variable thrust liquid rocket motors. The most basic approach is to provide means for varying flow rates of the propellant to the combustion chamber of a rocket motor and both variable area and fixed area injection systems have been employed to accomplish this procedure. With respect to fixed area injectors, the flow rate is controlled by line throttling with external control valves; however, injection pressure drops become excessive in such systems and it is impossible to maintain the necessary flow pattern when deep throttling occurs. The use of variable area injectors tends to overcome this particular problem to some extent, but these systems necessarily require that the value surfaces used to vary the injector area are exposed to high temperature combustion gases which tend to erode the valve surfaces and prevent positive shutoff. Other systems, such as the use of ganged engines in which any desired thrust can be delivered by turning on the proper number and size of engines have also been proposed, but such systems are generally bulky and heavy and are far more complex than the systems which vary the flow rate of the propellants to the combustion chamber.

This invention, however, provides throttling over wide thrust ranges and at the same time maintains the simplicity of the line throttling technique employed with conventional fixed area injector systems. The multiple manifold injector structure of this invention overcomes the difficulties noted above by providing two or more sets of complete fixed area injection manifolds for each of the fluid fuel and oxidizer. Low thrust operation employs only one manifold set, flow through which is controlled by line throttling upstream of the injector. When the desired thrust level exceeds that which can be produced by one manifold set, another manifold set is operated to provide higher thrust. If higher thrust levels than can be obtained through combined operation of both manifold sets is required, additional manifold systems can be employed.

It is therefore an object of this invention to provide a manifold structure for producing variable wide range throttling of a fluid propellant rocket engine.

It is another object of this invention to provide a method for producing wide range throttling of fluid propellant rocket engines.

These and other objects of this invention will be readily apparent from the following description with reference to the accompanying drawings wherein.

DESCRIPTION OF THE INVENTION

Figure 1:
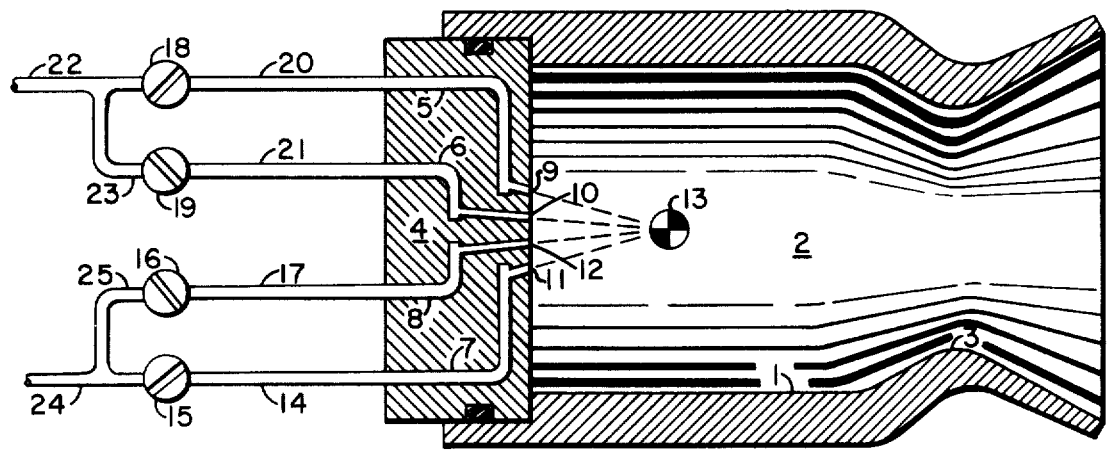
FIG. 1 is a schematic cross-sectional representation of a fluid propellant rocket engine employing the manifold system of this invention.

Referring now to FIG. 1, a rocket motor according to this invention consists of a casing 1 defining the combustion zone 2 and having a thrust producing nozzle section 3 at the aft end thereof. The forward end of the casing 1 is provided with an injector structure 4. Fuel manifold passages 5 and 6 and oxidizer manifold passages 7 and 8 may be machined into the injector body. Passages 5 and 7 constitute a first manifold set and passages 6 and 8 constitute a second manifold set. Injector orifices 9, 10, 11 and 12 communicate respectively with manifold passages 5, 6, 7 and 8. The injector orifices are distributed across the face in any desired pattern, such as, for example, the duo-doublet pattern; however, only one injection grouping is shown in FIG. 1 for reasons of clarity. The injector orifices are arranged for each manifold set such that they have a common impingement point 13. The oxidizer manifold 7 of the first manifold set is connected by pipe 14 to flow control valve 15 and the oxidizer manifold passage 8 of the second manifold is connected to flow control valve 16 by pipe 17. Likewise, fuel manifold passage 5 of the first manifold set and fuel manifold passage 6 of the second manifold set are connected to variable flow control valves 18 and 19 by means of passages 20 and 21, respectively. A source of pressurized fuel is provided upstream of fluid flow control valves 18 and 19 and in communication therewith by means of pipes 22 and 23. Likewise, a source of pressurized oxidizer is upstream of flow control valves 16 and 15 and in communication therewith by means of pipes 24 and 25. The passages 5 and 7 of the fuel and oxidizer manifolds of the first set are located adjacent the surface of the injector face to provide for cooling of the injector face at all thrust levels. The manifolds passages of the second manifold set are recessed within the body of the injector. While only two manifold sets are illustrated in FIG. 1, it will be readily apparent that three, four or more manifold sets can be employed if desired to increase the range of throttling as will be hereinafter described.

Figure 3:
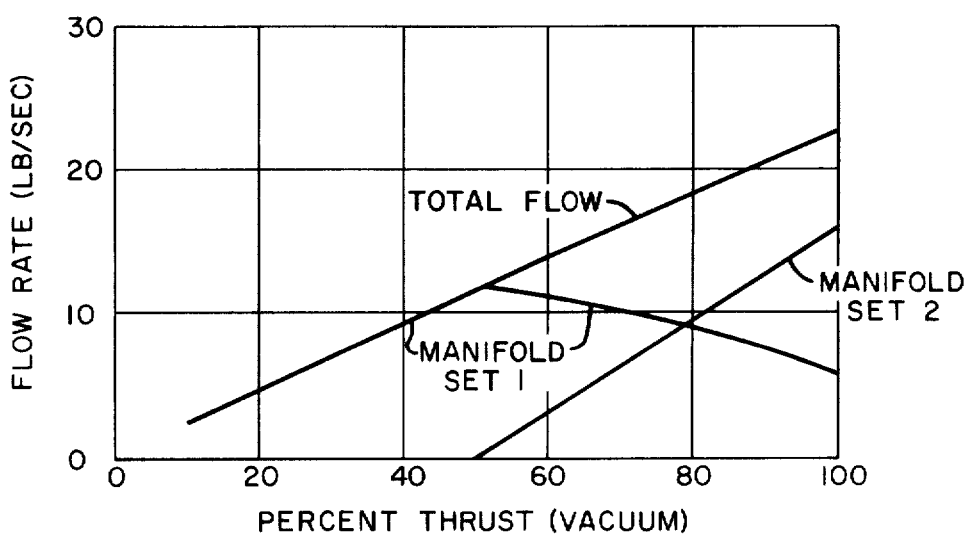
FIG. 3 is a curve showing the operating characteristics of a typical rocket motor according to this invention.

In operation of the injector system, a pressurized fuel such as unsymmetrical dimethyl hydrazine and an oxidizer such as nitrogen tetroxide are provided. These materials are hypergolic and it is not necessary to provide a separate igniter; however, it is recognized that if the materials are non-hypergolic, a conventional igniter can be employed. To operate the system, valves 15 and 18 are opened to provide flow of the fuel and oxidizer through passages 7 and 8 and injector ports 9 and 11. The pressurized fluids are injected into the combustion chamber and impinge at point 13 causing hypergolic ignition and combustion of the materials. The flow of the propellants can be adjusted by control of valves 15 and 18 until the valves are completely opened and the first manifold set is operating at its maximum thrust level. An effective operating range for manifold set 1 is shown in FIG. 3. At this time, valves 16 and 19 of the second manifold set are opened to permit additional flow of fluid through the second manifold set through passages 6 and 8 and injector orifices 10 and 12 into combustion chamber 2. The fluid lines flowing from injector orifices 10 and 12 also impinge at a common impingement point 13. The thrust of the engine can be increased, as shown in FIG. 3, by opening valves 16 and 19 to their maximum. If additional manifold sets are provided, additional thrust can also be obtained in a like manner.

In practice it has been found that a substantial improvement in performance occurs when the fuel and oxidizer streams of the first and second manifold sets impinge near the injector face, particularly when the engine is operating at the intermediate thrust levels obtained with low flow rates through the second manifold set. During this phase of operation the pressure drop across the injector orifices of the second manifold set are quite low due to the large pressure drop across the flow control valves. At this level the pressure drop across the injector orifice may not be adequate in and of itself to provide distribution and mixing of the propellants required for stable and efficient operation. However, by causing the propellants injected from the first manifold set, which in this thrust region undergo a substantial pressure drop across the injector orifice, to impinge upon the propellants injected from the second manifold set, sufficient energy and momentum is transferred to produce the mixing and distribution of propellants necessary for stable combustion.

Figure 2:
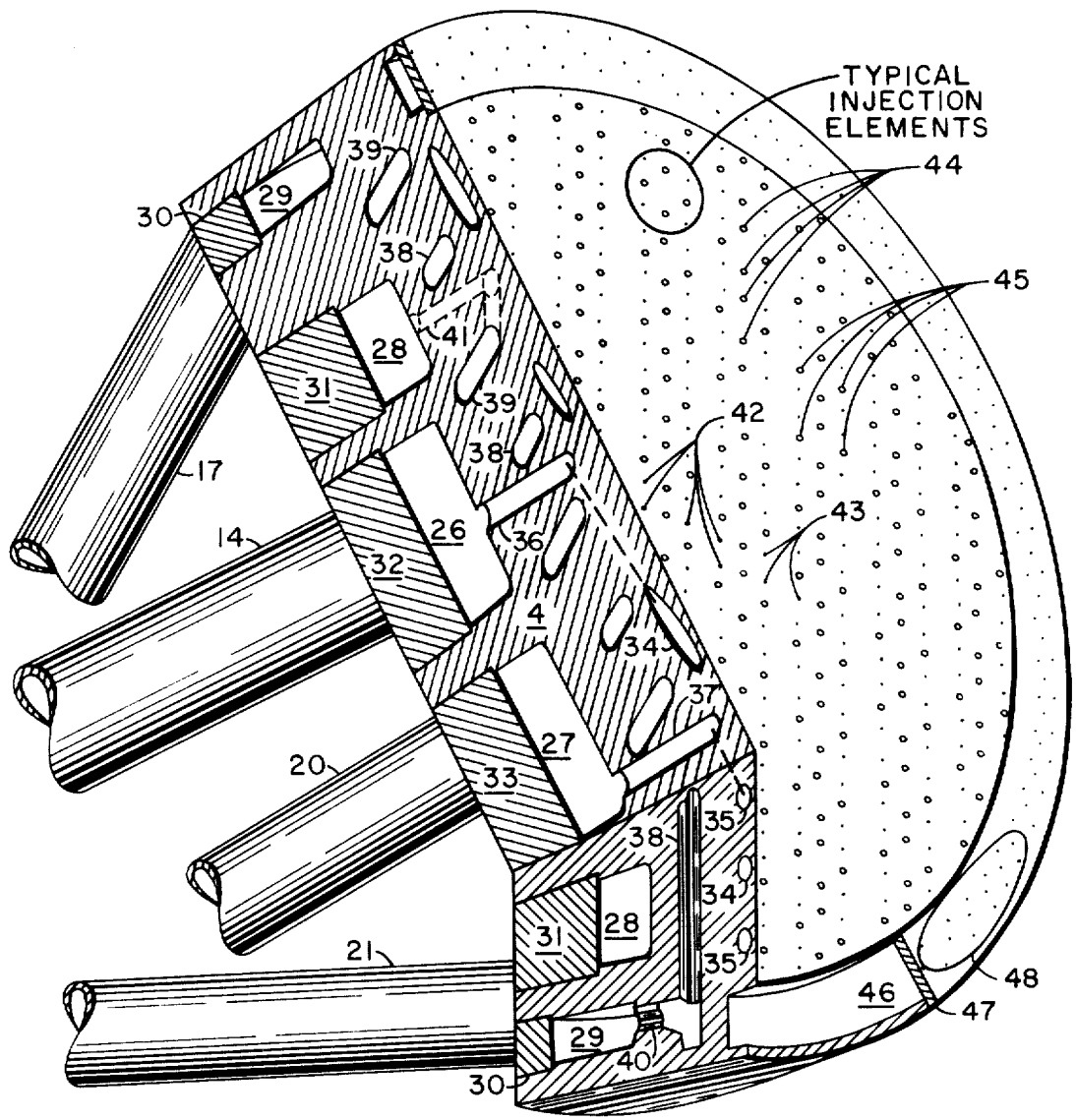
FIG. 2 is a detailed view through a section of an injector according to this invention.

A specific preferred embodiment of the injector structure, according to this invention, is shown in detail in FIG. 2. The injector body 4 has an injector face provided with plurality of injection elements distributed there across. The injector pattern is shown in FIG. 2 as being a duo-doublet pattern; however, other patterns could be used if desired. The injector body 4 has machined therein a plurality of channels constituting the various manifold chambers. The oxidizer manifold of the first manifold set is shown as 26 and the fuel manifold of the first manifold set is shown as 27. The oxidizer manifold of the second manifold set is shown as 28, and the fuel manifold of the second manifold set is shown as 29. Backing plates 30, 31, 32 and 33 are securely mounted within manifold chambers 29, 28, 26 and 27, respectively, and provide an integral leak-free manifold chamber. The fuel and oxidizer pipes of the first manifold set, 20 and 14, communicate respectively with the manifold chambers 27 and 26 through backing plates 33 and 32. Likewise, the fuel and oxidizer pipes 21 and 17 of the second manifold set extend, respectively, through backing plates 30 and 31 of manifold set 2. To provide proper communication between the injection elements and their associate manifold chambers, a plurality of manifold feeders are drilled through injector body 4, the ends of said feeders at the periphery of the injector being sealed with plugs, not shown. Thus, manifold feeders 34 and 35, running parallel to the surface of the injector face and slightly therebelow, serve as oxidizer and fuel feeder lines respectively for the first manifold set. Manifold feeders 34 and 35 communicate with manifold channels 36 and 37 running perpendicular to the face of the injector and in communication with the interior of the manifold chambers 26 and 27, respectively, to provide for the distribution of the fluid materials. Likewise, with respect to the second manifold set, a plurality of fuel and oxidizer manifold feeders 38 and 39 are disposed running parallel to the face of the injector, but at a lower level within the injector and each of these feeders 38 and 39 is likewise in communication with manifold channels such as 40 and 41 which are in communication with the fuel manifold chamber 29 and oxidizer manifold chamber 28, respectively.

A typical injection element set is outlined in the circle on FIG. 2. Each set consists of two fuel injector elements and two oxidizer injector elements for each manifold set, a complete injection element set comprising eight injection elements. All the elements of a set are drilled through the injector face into communication with the appropriate feeder channel at an angle such that they all have a common impingement point as previously discussed. Thus each set has associated therewith a unique impingement point. The fuel orifices 42 and oxidizer orifices 43 of the first manifold set are shown as being smaller in size than the fuel orifices 44 and oxidizer orifices 45 of set 2 so that a proper spray pattern can be maintained at the low flow rates contemplated for the operation of the first manifold set. Also, the fuel injectors for each manifold set are generally smaller in size than the oxidizer injector elements for each manifold set in this particular design in order to maintain the proper flow rate balance between the flows of the various materials.

It should be recognized, however, that the relative sizes of the various injection elements depend upon the particular propellant system being used. In other systems the oxidizer injection elements could be smaller or of the same size as the fuel injection elements.

In addition to the structure already described, a fuel film coolant manifold 46 is located along the periphery of the injector body 4. A cover plate 47 provided with a plurality of orifices 48 directs a spray of fuel along the combustion chamber wall to provide a degree of cooling therefor. The fuel film coolant manifold 46 is in fluid communication with fuel manifold 27 through the first manifold set fuel feeders 35 which extend through the inner wall of manifold 46. Cover plate 47 provided with orifices 48 encloses the manifold 46 and provides for a spray of fuel directed along the combustion chamber wall. The film coolant manifold is employed with respect to uncooled or an ablatively cooled combustion chamber. However, the film coolant would not be required in a regeneratively cooled combustion chamber and the instant injector structure without the film coolant manifold is suitable for such applications. In addition, a zone of shower head type injection ports can be located about the periphery of the injector to provide an additional degree of protection for the chamber wall.

EXAMPLE 1

A duel manifold injector was installed in a rocket motor having a conical combustion chamber 14.6 inches long, 5.8 inches in diameter at its forward end and 4 inches in diameter at the aft end. The exit cone half angle was 20°. Such a motor was fired using nitrogen tetroxide as the oxidizer and a 50—50 mixture of unsymmetrical dimethyl hydrazine and hydrazine as the fuel. The total propellant flow rate ranged from 2.2 to 22 pounds per second and smooth transitions between the various thrust levels was observed when the propellant flow rate was varied while the motor was firing. The following table illustrates the results of one series of runs of the above motor. The motor thrust was measured at ambient atmosphere of 14.3 psia and the vacuum thrust was calculated. Percentage of thrust indicated in Table I is based on vacuum basis.

The injector pattern used had eighty common duo-doublets plus shower head and fuel film coolant injection ports. The first manifold set was designed to be capable of providing 50 percent of maximum thrust and to operate at about a 200 psi pressure drop. The second manifold set was designed to provide an additional 50 percent to thrust to produce the maximum 100 percent thrust when both the first and second manifold sets were operating at maximum, and was designed to operate at 55 psi pressure differential. The specific details of the injector structure are set forth in Table II.

Table I

| Percent thrust | Chamber pressure, p.s.i.a. | Manifold set 1 | | Manifold set 2 | | Oxidizer fuel ratio, O/F | Thrust measured, lbs. | Vacuum thrust calc., lbs. |
|---|---|---|---|---|---|---|---|---|
| | | Oxidizer flow rate, lb./sec. | Fuel flow rate, lb./sec. | Oxidizer flow rate, lb./sec. | Fuel flow rate, lb./sec. | | | |
| 7.9 | 23.3 | 0.992 | 0.590 | | | 1.68 | 138.0 | 504.4 |
| 11.7 | 34.2 | 1.58 | 0.842 | | | 1.88 | 300.0 | 740.3 |
| 19.5 | 58.5 | 2.62 | 0.760 | | | 1.716 | 643.8 | 1,232.0 |
| 32.8 | 98.1 | 4.59 | 2.360 | | | 1.945 | 1,250.1 | 2,066.0 |
| 43.9 | 130.4 | 6.15 | 2.980 | | | 2.063 | 1,766.1 | 2,747.0 |
| 54.5 | 159.1 | 7.22 | 3.710 | | | 1.95 | 2,220.2 | 3,468.0 |
| 57.3 | 166.5 | 7.38 | 3.660 | | | 2.02 | 2,356.0 | 3,619.0 |
| 80.0 | 232.6 | 6.43 | 3.310 | 4.31 | 2.13 | 1.97 | 3,360.0 | 5,071.0 |
| 81.0 | 233.3 | 6.46 | 3.330 | 4.31 | 1.90 | 2.06 | 3,345.0 | 5,086.0 |
| 91.8 | 273.5 | 5.17 | 2.600 | 7.43 | 3.86 | 1.95 | 3,870.0 | 5,843.0 |
| 100.00 | 296.0 | 4.32 | 2.070 | 9.50 | 4.88 | 1.99 | 4,270.0 | 6,363.0 |
| 62.0 | 182.8 | 7.28 | 3.790 | 1.09 | 0.593 | 1.91 | 2,540.0 | 3,943.0 |
| 20.8 | 61.2 | 2.90 | 1.400 | | | 2.07 | 683.0 | 1,296.0 |

TABLE II.—INJECTOR DESIGN FLOW RATES

| Manifold | Maximum flow rate, lb./sec. | Thrust, percent | Total area, sq. inch | Coolant film, percent | Shower-head, percent | No. of injection holes |
|---|---|---|---|---|---|---|
| No. 1 fuel | 3.84 | 50 | 0.0933 | 9.4 | 11.7 | 242 |
| No. 1 oxidizer | 7.68 | 50 | 0.147 | 0 | 8.8 | 182 |
| No. 2 fuel | 5.46 | 100 | 0.272 | 0 | 0 | 160 |
| No. 2 oxidizer | 10.92 | 100 | 0.379 | 0 | 0 | 160 |

While this invention has been described with respect to a specific embodiment thereof, this embodiment is considered to be illustrative rather than limiting of the invention. Various modifications may be made without departing from the scope of this invention, which is limited only by the following claims, wherein we claim:

We claim:

1. A variable thrust fluid propellant rocket motor comprising:
   a. a source of a fluid fuel,
   b. a source of a fluid oxidizer,
   c. a combustion chamber provided with thrust producing nozzle means at the aft end,
   d. an injector in the forward end of said combustion chamber, said injector being provided with a multiplicity of sets of injector orifices, each set comprising first, second, third and fourth fixed area injector orifices on the face thereof which is exposed to said combustion chamber, said first, second, third and fourth fixed area injector orifices of each said set being directed to cause impingement, at a common point, of fluid emitted from each said orifice, which said point is unique for each said set,
   e. at least first and second oxidizer supply lines in fluid communicating relationship with said source of oxidizer and said injector,
   f. at least first and second fuel supply lines in fluid communicating relationship with said source of fuel and said injector,
   g. variable flow control means associated with each of said fuel and oxidizer supply lines for adjusting the fluid flow in each of said lines independently to any level between full on and full off inclusive, and
   h. first, second, third and fourth fluid distributing means in said injector providing fluid communication between said first oxidizer supply line and said first injector orifice, said first fuel supply line and said second injector orifice, said second oxidizer supply line and said third injector orifice, and said second fuel supply line and said fourth injector orifice respectively;

whereby operation of said rocket motor at varying thrust levels up to a first predetermined maximum may be obtained by flowing fluid only through said first fuel and oxidizer supply lines and operation at varying thrust levels up to a second predetermined maximum may be obtained by flowing fluid through said second fuel and oxidizer supply lines while fluid is flowing through said first fuel and oxidizer supply lines.

2. The rocket motor of claim 1 wherein said first and second fluid distributing means comprise, in part, passages in said injector extending substantially parallel to and subjacent to said face thereof whereby regenerative cooling of said injector face is obtained at all thrust levels.

* * * * *